June 12, 1945.	L. C. ROTTER ET AL	2,378,329
SWIVEL JOINT
Filed Sept. 20, 1943

Ludwin C. Rotter,
Victor G. Klein,
Inventors.
Haynes and Koenig,
Attorneys.

Patented June 12, 1945

2,378,329

UNITED STATES PATENT OFFICE 2,378,329

SWIVEL JOINT

Lutwin C. Rotter, Maplewood, and Victor G. Klein, St. Louis, Mo., assignors to Lincoln Engineering Company, St. Louis, Mo., a corporation of Missouri Application September 20, 1943, Serial No. 503,059

2 Claims. (Cl. 285—97.3)

This invention relates to swivel joints, and with regard to certain more specific features, to such joints for fluid passages.

Among the several objects of the invention may be noted the provision of a fluid-carrying swivel in which a substantial increase in bearing length is obtained between the swiveling parts without requiring lengthening the swivel as a whole; the provision of a swivel of the class described which is less subject to nipple breakage at the packings than heretofore; and the provision of a device of this class which may be economically manufactured with a lower number of parts. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

Figure 1:
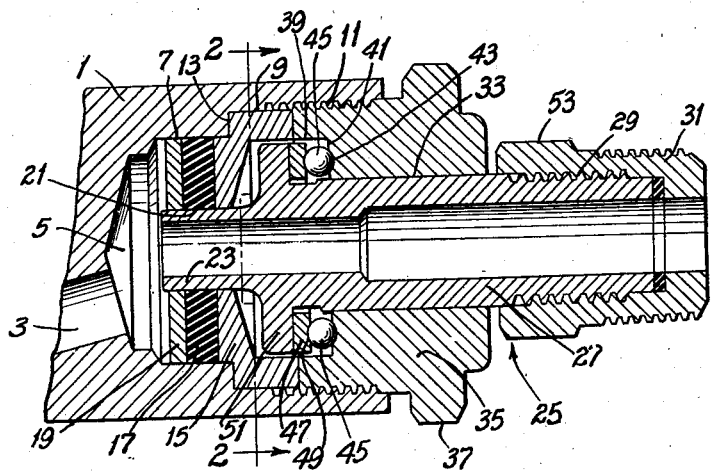
Figure 2:
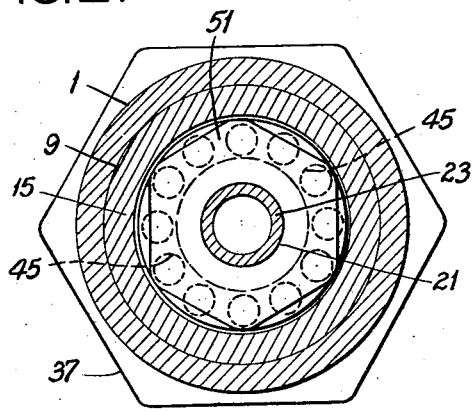

In the accompanying drawing, in which is illustrated one of various possible embodiments of the invention, Fig. 1 is a longitudinal section showing my invention; and, Fig. 2 is a cross section taken on line 2—2 of Fig. 1.

Similar reference characters indicate corresponding parts throughout the several views of the drawing.

Referring now more particularly to Fig. 1, there is shown at numeral 1 a hollow element of the swivel, the same including a lubricant passage 3. Element 1 is bored as indicated at 5 and double counterbored at 7 and 9. Counterbore 9 is threaded as indicated at 11. Seated on the shoulder 13 between the counterbores 7 and 9 is a cup-shaped gland-forming member 15, which is preferably made of soft steel. Member 15 reaches partially into the counterbore 7. It is held in place by a nut 35 screwed into threads 11. Adjacent to this member 15 is a circular packing 17, next to which is a washer 19. A hole 21 passes through the members 15, 17 and 19 for accommodating a nipple 23 of the swiveling element indicated in general by numeral 25.

The element 25 is constituted by a soft steel tube 27 threaded at 29 to accommodate an outside connector member 31. The tube 27 has a relatively long bearing 33 in the holding nut 35. The nut carries a hexagonal wrench engaging portion 37 and is counterbored at 39 to provide a seat 41 in which a groove 43 is coined. The groove is worked into the seat 21 by a coining press operation which has the effect of cold-working the metal adjacent to the groove 43 which produces a dense mill finish at this point. The nut is then hardened.

The coined groove 43 forms a race for ball bearings 45. On the other side of the bearings 45 is a ring 47 which is formed by punching from soft steel. During or after the punching operation a groove 49 is coined into the ring which also produces a dense mill finish bearing race. The ring is then hardened. The ring 47 is supported upon a flange 51 extending from the tube 27. The tube 27, flange 51 and nipple 23 are all integral and composed of soft steel, as stated.

For assembly purposes the flange 51 is made hexagonal as shown in Fig. 2 so that first the nut 35 may be slipped into position on the sleeve 27 with the ring 47 and bearings 43 in place. Then the attachment member 31 may be threaded on and pulled up into position by applying wrenches to the hexagonal flange 51 and the hexagonal head 53 of the member 31. After inserting the parts 15, 17 and 19 in the openings 7 and 9, the nut 35 is threaded home which holds in place said parts 15, 17 and 19 while holding the nipple 23 inserted therein.

By eliminating a separate part for the race 43 and coining it directly into the nut 35, additional bearing area is obtained for the rotary action between the tube 27 and the nut 35. Furthermore, by coining the other groove 49 into a stamped ring 47 and then hardening it, it becomes unnecessary to harden any part associated with the tube 27. Thus the whole tube may be made soft. The result is that with a longer bearing between members 27 and 35 there is less tendency for cocking action of the nipple 23 in the parts 15, 17 and 19. Furthermore, since the nipple is of soft steel, instead of hard as heretofore, any slight cocking action that may take place is not so likely to break off the nipple. Breaking of similar but hard nipples in packing glands has heretofore been a source of constant difficulty in swivel apparatus of this class. Finally, the tube 27 constitutes a relatively soft journal in a hard surrounding bearing, which is a favorable bearing combination. The parts 19 and 15 together function as a gland for retaining the packing 17. The element 15 of this gland is held in place by the nut 35 and coacting counterbores 7 and 9. The washer element 19 is forced by internal pressure against the packing 17 to squeeze the latter against the nipple 23 for sealing purposes.

In view of the above, it will be seen that the several objects of the invention are achieved and other advantageous results attained.

As many changes could be made in the above constructions without departing from the scope of the invention, it is intended that all matter contained in the above description or shown in the accompanying drawing shall be interpreted as illustrative and not in a limiting sense.

We claim:

1. A fluid conduit swivel comprising an outside hollow body having a double-stepped counter-bore with a shoulder and being threaded to receive a threaded holding nut, a packing gland consisting of a cup-shaped member seating on said shoulder and engageable at its rim to be held by the nut, said member having an opening therethrough, said gland including a packing ring having on one of its sides the bottom of the cup-shaped member and on the other side a washer, the washer being movable in said hollow body portion in response to pressure carried therein in order to squeeze the ring, a tubular member passing through the nut, said tubular member carrying within the body member an outwardly directed flange overhanging the inside of the nut and located in said cup-shaped gland member and also having a nipple extending inward from said flange and through both parts of the gland and the packing, said nut being hardened and having a bearing race directly on its inside surface adjacent said flange, thereby providing for increased bearing length between the tubular member and the nut, a separate hardened bearing ring under the flange, and ball bearings located between said hardened ring and the hardened nut.

2. A fluid conduit swivel comprising an outside hollow body having a double-stepped counter-bore with an intermediate shoulder and being threaded to receive an interiorly cupped holding nut, a packing gland consisting of a cup-shaped member having a step seating on said shoulder and engageable at its edge by the edge of the nut to be held thereby, said member and nut providing an enclosed hollow portion, said member having an opening therethrough, said gland including a packing ring having on one of its sides the bottom of the cup-shaped member and on the other side a washer, the washer being movable in said hollow body portion in response to pressure carried therein to squeeze the ring, a tubular member passing through the nut, said tubular member carrying within the body member an outwardly directed flange located in said enclosed hollow portion and also having a nipple extending inward from said flange and through both parts of the gland and the packing, said tube, nipple and flange being unhardened, said nut being hardened and having a bearing race directly on its inside surface adjacent said flange, a separate hardened bearing ring under the flange, and ball bearings located between said hardened ring and the hardened nut and contacting the latter directly, thereby providing for improved bearing means between the tubular member and the nut both as to length and bearing materials.

LUTWIN C. ROTTER.
VICTOR G. KLEIN.